United States Patent
Proulx et al.

(10) Patent No.: US 10,454,900 B2
(45) Date of Patent: Oct. 22, 2019

(54) REMOTE AUTHENTICATION AND PASSWORDLESS PASSWORD RESET

(71) Applicant: McAfee, Inc., Santa Clara, CA (US)

(72) Inventors: Francois Proulx, Montreal (CA); Mathieu Rene, Montreal (CA); Richard Reiner, Montreal (CA)

(73) Assignee: McAfee, LLC, Santa Clara, CA (US)

( * ) Notice: Subject to any disclaimer, the term of this patent is extended or adjusted under 35 U.S.C. 154(b) by 71 days.

(21) Appl. No.: 14/866,217

(22) Filed: Sep. 25, 2015

(65) Prior Publication Data

US 2017/0093805 A1 Mar. 30, 2017

(51) Int. Cl.
*H04L 9/00* (2006.01)
*H04L 29/06* (2006.01)
*H04L 9/08* (2006.01)

(52) U.S. Cl.
CPC ........ *H04L 63/0428* (2013.01); *H04L 9/0822* (2013.01); *H04L 9/0863* (2013.01); *H04L 63/062* (2013.01); *H04L 63/083* (2013.01); *H04L 63/0876* (2013.01); *H04L 2209/24* (2013.01); *H04L 2463/062* (2013.01)

(58) Field of Classification Search
CPC .................................................. H04L 63/0428
USPC ........................................................ 713/168
See application file for complete search history.

(56) References Cited

U.S. PATENT DOCUMENTS

| | | | |
|---|---|---|---|
| 6,826,686 B1 * | 11/2004 | Peyravian | G06F 21/31 713/168 |
| 9,455,968 B1 * | 9/2016 | Machani | H04W 12/04 |
| 2010/0290623 A1 | 11/2010 | Banks et al. | |
| 2014/0140508 A1 * | 5/2014 | Kamath | H04L 9/0822 380/255 |

(Continued)

FOREIGN PATENT DOCUMENTS

| | | | | |
|---|---|---|---|---|
| EP | 2365660 A1 * | 9/2011 | ......... | G06F 21/6218 |
| WO | 2014029951 | 2/2014 | | |
| WO | 2015135063 | 9/2015 | | |

OTHER PUBLICATIONS

International Searching Authority, "International Search Report," issued in connection with International Patent Application PCT/US2016/053130, dated Dec. 14, 2016, 3 pages.

(Continued)

*Primary Examiner* — Alexander Lagor
*Assistant Examiner* — Syed M Ahsan
(74) *Attorney, Agent, or Firm* — Hanley, Flight & Zimmerman, LLC

(57) ABSTRACT

A passwordless reset technique includes actions to receive a request for a password reset, wherein the request password reset is initiated at a first device, determine that the first device is a trusted device, authenticate the user in order to obtain a cloud key from a network device, wherein the cloud key is associated with the first device, derive a key encryption key using the cloud key, decrypt a local storage key using the key encryption key, decrypt a local storage using the local storage key to obtain a content encryption key, (Continued)

obtain a new password via user input, re-encrypt the content encryption key, and transmit it to the network device, derive a new authentication token using the new password, and transmit the new authentication token to the network device.

17 Claims, 7 Drawing Sheets

(56) References Cited

U.S. PATENT DOCUMENTS

| | | | |
|---|---|---|---|
| 2014/0237627 A1* | 8/2014 | Mylavarapu | ........ H04L 63/0428 726/30 |
| 2015/0256336 A1 | 9/2015 | Stiglic et al. | |
| 2017/0142082 A1* | 5/2017 | Qian | ....................... G06F 21/62 |

OTHER PUBLICATIONS

International Searching Authority, "Written Opinion of the International Searching Authority," issued in connection with International Patent Application PCT/US2016/053130, dated Dec. 14, 2016, 8 pages.

International Searching Authority, "International Preliminary Report on Patentability," issued in connection with International Patent Application PCT/US2016/053130, dated Mar. 27, 2018, 9 pages.

\* cited by examiner

REMOTE AUTHENTICATION AND PASSWORDLESS PASSWORD RESET

TECHNICAL FIELD

Embodiments described herein generally relate to device security, and more particularly to device-specific cryptographically bootstrapped multi-factor server-side authentication triggered release of key wrapping material.

BACKGROUND ART

Traditionally, authentication to a web service is accessed through a web portal. Commonly, the portal is accessed through the user directing a web browser to a web portal via a Uniform Resource Locator (URL), which is a representation of the web portal address, usually in a more human readable form.

Authentication for the web portal usually takes the approach of requiring the user to input a unique combination of a username and a password that identifies and authenticates that specific user. The web portal usually prompts the user for submission of these credentials in a web-based form. The web-based forms present themselves in the form of standards-based web browser renderable code. The credentials are usually input into the web browser, utilizing special policy requirements that determine the number and type of characters required within the password to access that web service. Longer alphanumeric character string passwords usually provide stronger defense against brute force computational attacks.

Existing credential manager software typically allows a user to register credentials for logging into a web site with the credential manager. Upon accessing the relevant web page, the credential manager injects the credentials into the web authentication form, using an application programming interface (API) and software development kit (SDK) tools provided by the browser. The injection is typically done by means of a content script, typically JavaScript code, that is injected into the web page by the credential manager browser extension. The content script runs in the user's browser, and fills in the web form, including possibly automatically submitting the form back to the web site for completing the login.

Past attempts to harden security have included implementing "zero knowledge" encryption schemes. "Zero knowledge" indicates that the encryption and decryption is based upon information that only the authenticating user knows, thereby preventing the credential manager or the entity supplying the credential manager from having access to the credentials. Zero knowledge schemes typically involve an encryption key that is held separately by the authenticating user, or derived from information held separately by the authenticating user, allowing the credential manager to store the encrypted credentials, with none of the information required to decrypt them.

However, when the user loses or forgets the encryption key, all access to the encrypted credentials is lost, because neither the user nor the credential manager has sufficient information to decrypt the encrypted credentials.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily referring to all the same embodiment.

As used herein, the term "computer system" can refer to a single computer or a plurality of computers working together to perform the function described as being performed on or by a computer system.

As used herein, the term "server" can refer to any computer system that is capable of communicating with and hosting an operating system and associating applications for another computer system across any type of network.

As used herein, the term "machine readable medium" can refer to a single physical medium or a collection of physical media that together store data or instructions described as being stored on the medium.

Although described below in terms of software modules and algorithms, all or any desired portion of the techniques may be implemented in hardware, software, or firmware, or any combination thereof Embodiments described below provide for cryptographic key wrapping. For example, a key may be used only for wrapping other cryptographic keys. The only way to get the wrapper key may be to derive the wrapper key using pieces from two different locations. Thus, accessing an asset in local storage may require remote authentication from a server. Further, in one embodiment, a master password may be reset without any knowledge of the original master password by using the key splitting technique.

According to one or more embodiments, a key bag includes at least a content encryption key, and is stored in local storage. The local storage may be encrypted with a randomly generated local storage key, which may be encrypted with a device specific cloud key generated by a server.

Figure 1:
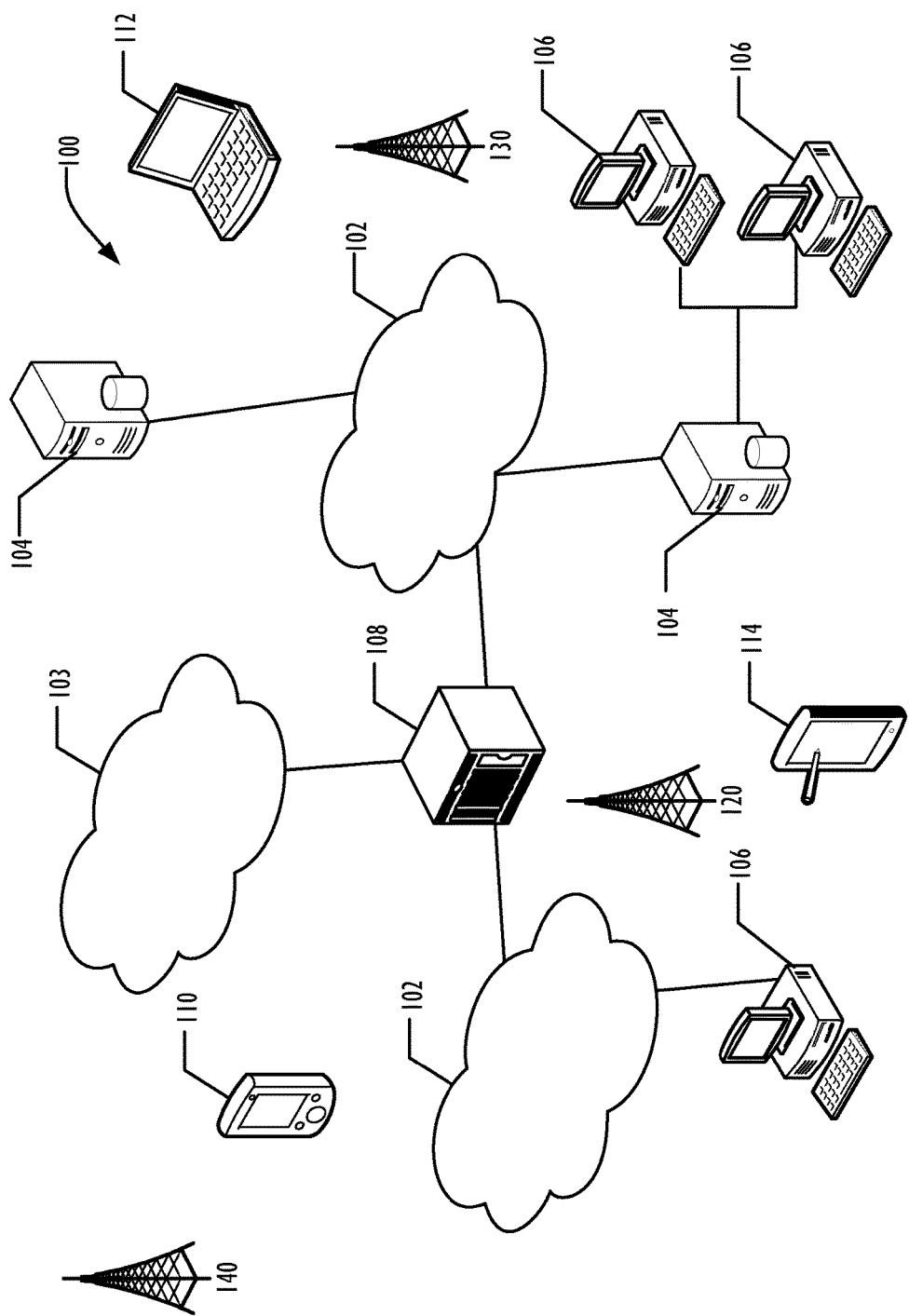
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Figure 2:
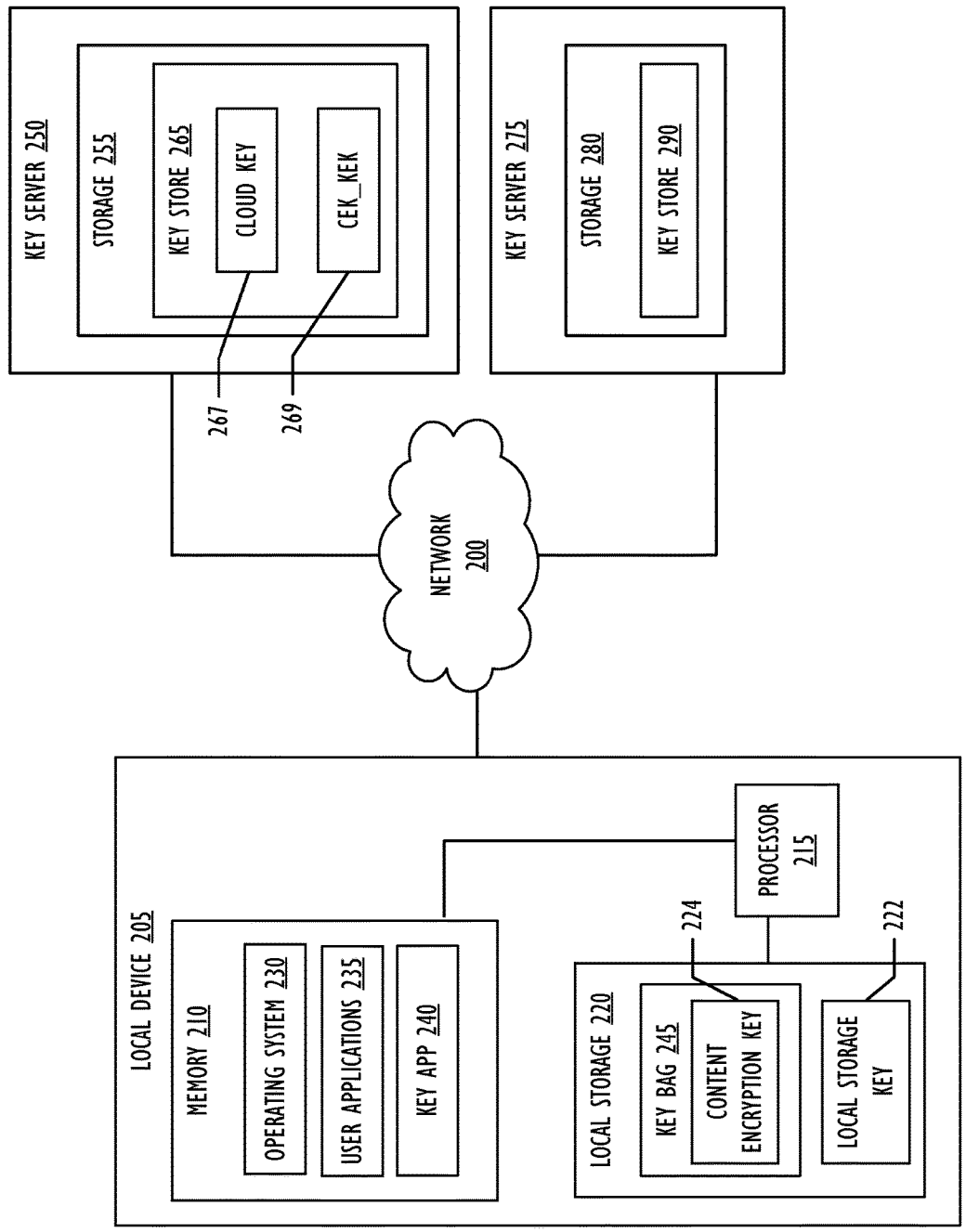
FIG. 2 is a diagram illustrating a system for passwordless reset in a network according to one or more embodiments.

FIG. 2 is a diagram illustrating a system for providing distributed cryptographic key wrapping. FIG. 2 includes three devices, including Local Device 205, Server 250, and Server 275, connected across Network 200. Network 200 may be any type of computer network, such as a LAN or a corporate network. For example, Network 200 may include a subset of the devices included in larger network 102 or 103. It should be understood that the components are depicted in FIG. 2 as an example embodiment, and some or all of the various components may be located, for example, within a single server, multiple servers, network storage, or other network devices.

Local Device 205 includes a processor core 215. Processor core 215 may be the core for any type of processor, such as a microprocessor, an embedded processor, a digital signal processor (DSP), a network processor, or other device to execute code. Although only one processor core is illustrated in each trusted device in FIG. 2, a processing element may alternatively include more than one of the processor core 215 illustrated in FIG. 2. Processor core 215 may each be a single-threaded core or, for at least one embodiment, processor core 215 may be multithreaded in that it may include more than one hardware thread context (or "logical processor") per core.

Local Device 205 also includes a memory 210 coupled to the processor. Memory 210 may be any of a wide variety of memories (including various layers of memory hierarchy) as are known or otherwise available to those of skill in the art. Program code, or instructions, such as the operating system 230, the user applications 235, and a credential manager application 240, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, non-transitory medium through which the program code may pass, such as antennas, optical fibers, communications interfaces, etc. Program code may be transmitted in the form of packets, serial data, parallel data, etc., and may be used in a compressed or encrypted format. The processor core 215 follows a programmed sequence of instructions indicated by the code. In this manner, processor core 215 is transformed during execution of the code.

Although not illustrated in FIG. 2, a processing element may include other elements on chip with the processor core 215. For example, a processing element may include memory control logic along with the processor cores. The processing element may include I/O control logic and/or may include I/O control logic integrated with memory control logic. The processing element may also include one or more caches.

Servers 250 and 275 may each provide remote authentication of a user at local device 205. In one or more embodiments, a single server 250 may be used to provide a storage 255 that contains a key store 265 that includes a cloud key 267 generated by the server 250 and used as a key specific to local device 205. In one or more embodiments, the functionality of the server may be distributed among server 250 and server 275, which provides another storage 280 that provides a key store 290.

Credential manager application 240 may provide an interface for a user to set up or change a master password. In one or more embodiments, the application 240 also uses other data, such as biometric data, to perform multifactor authentication of a user. The key portions used in one or more embodiments may be stored in local storage 220 in a key bag 245. In one or more embodiments, the key bag 245 may store a content encryption key 224. Local storage may also include a local storage key 222, which may be randomly generated, and encrypted with at least a cloud key 267, such as one generated by server 250 and stored in key store 265. Local storage key 222 may be used to encrypt local storage 220, or at least a portion of local storage in which key bag 245 is stored.

Figure 3:
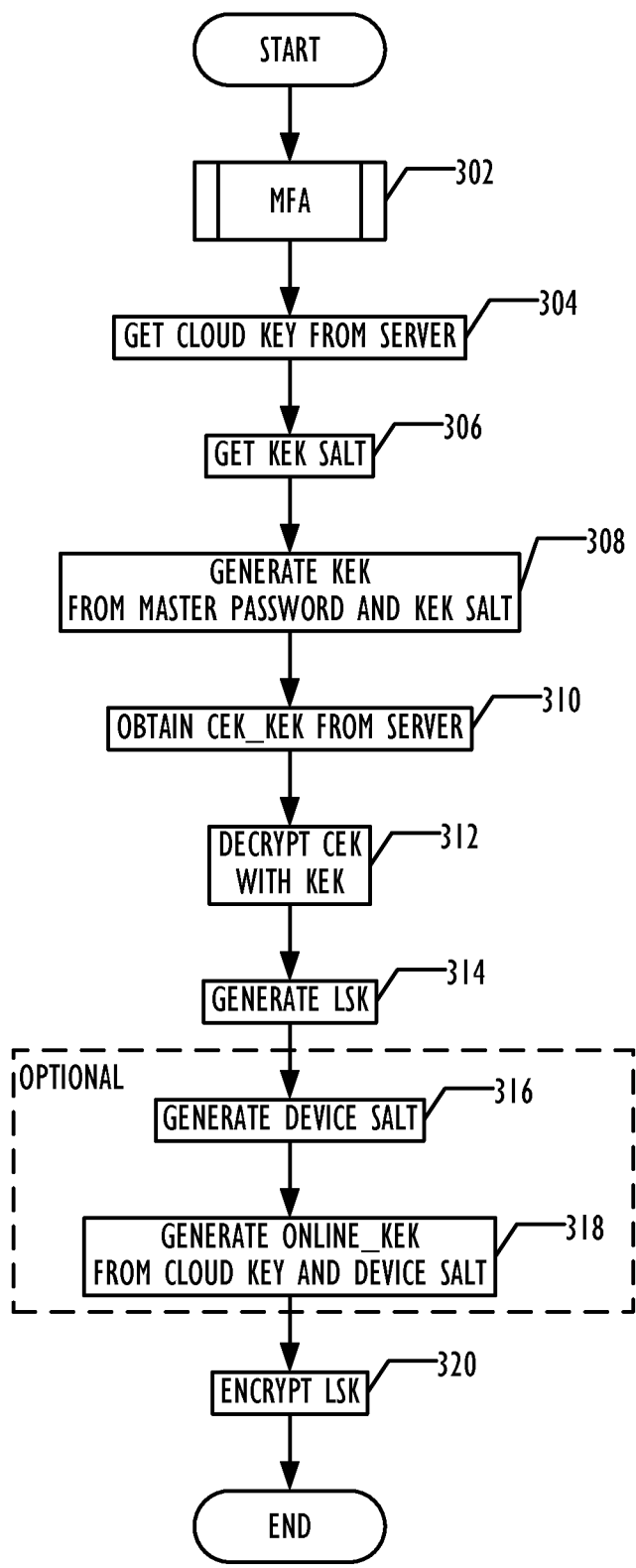
FIG. 3 is a flow chart illustrating a technique for distributed cryptographic key wrapping according to one or more embodiments.

FIG. 3 is a flow diagram illustrating a technique for distributed cryptographic key wrapping according to one or more embodiments. In one or more embodiments, part or all of the technique may be performed by application 240 on local device 205. In addition, some of the tasks may be performed by server 250 or 275. Although the various tasks in the flow chart are illustrated in a particular order, in one or more embodiments, any of the various tasks may be performed in a different order, or simultaneously with other tasks. Further, in one or more embodiments, certain tasks may be omitted, other tasks may be added, and tasks illustrated separately may be combined. The various actions illustrated in FIG. 3 are performed the first time a user is logging in using the application 240 on the local device 205. The assumption is made that the user has previously created an account, and thus can successfully be authenticated to the application 240.

The procedure begins at 302, where the user is authenticated using an e-mail address and a master password. (For clarity, actions that may be performed if the user fails to authenticate are omitted.) In one or more embodiments, the email address and master password are utilized together with another form of authentication such as a biometric to perform a multi-factor authentication to the server, such as server 250 or server 275. In some embodiments, an identifier other than the email address may be used for the authentication.

In one or more embodiments, the identity of the device 205 is determined. Although a simple device identifier may be transmitted as part of the authentication procedure and stored on the server 250/275, a more secure technique may be employed that uses a challenge-response protocol based on a secret key that is stored by the local device 205, but never transmitted to the server 250/275. In one embodiment, the application 240 may also provide an indication of whether the user wants the device 205 to be considered a trusted device. For purposes of the discussion below, the device 205 is considered as trusted on the first use.

The procedure continues at 304 and a cloud key 267 is obtained. In one or more embodiments, the cloud key 267 is obtained from the server 250 or 275. It may be necessary for a device to receive the cloud key 267 before locally stored information on the device may be decrypted. Thus, the authentication of a user on the local device 205 may trigger release of the cloud key 267 from the server 250 or 275. In one or more embodiments, the cloud key is device specific and a different cloud key 267 is generated for each device from which the user authenticates. The cloud key 267 is preferably only available from the server 250 or 275, and not stored locally. In one embodiment, the cloud key 267 is generated randomly by the server 250 or 275. Further, in one or more embodiments, the server 250 or 275 may employ a table or other data structure that identifies devices associated with the user, or the user's account, and cloud keys 267 associated with each of those devices. In one or more embodiments, the table or other data structure may also store additional information, such as whether each device should be considered a trusted device.

The procedure continues at 306, where a key encryption key salt is received from a server. In some embodiments, the key encryption key salt may be received from the same server as the cloud key 267. In other embodiments, the key encryption key salt may be obtained from a different server. In one embodiment, the key encryption key salt is generated on the local device 205 by the application 240 and sent to the server as part of the account creation procedure. At 308, a key encryption key is generated using the key encryption key salt and the master password. In one or more embodiments, the key encryption key may be generated on the local device 205.

The procedure continues at 310, where an encrypted content encryption key 269 is received. In one or more embodiments, the encrypted content encryption key 269 is received from a server. The content encryption key 224 was generated at the time of account creation, encrypted with the key encryption key (CEK_KEK), which is generated from the master password and key encryption key salt, and the encrypted content encryption key (CEK_KEK) 269 was stored by the server. The content encryption key 224 is associated with the user account via the email address and master password and is not specific to any device. In one embodiment, the content encryption key 224 is randomly generated. The content encryption key 224 is used to encrypt credentials stored by the credential manager application 205, and is only stored by the server as encrypted. At 312, the content encryption key 224 is decrypted by the application 240 using the key encryption key. The content encryption key may then be used by the application 240 to encrypt or decrypt credentials associated with the user, such as passwords or other credentials used for accessing resources at a website. The server 250 or 275 does not need to store the key encryption key.

In one embodiment, the key encryption key salt is not stored by the local device 205, but only by the server 250/275, and the key encryption key is not stored by either the local device 205 or the server 250/275.

In one or more embodiments, the content encryption key 224 may be stored locally in a key bag 245 that is stored in local storage 220. The key bag 245 may be any kind of data structure that stores data such as the content encryption key 224. For security, the key bag 245 containing the content encryption key 224 is encrypted using the local storage key 222.

At 314, the local storage key 222 is randomly generated. The local storage key 222 is randomly generated and used for encrypting and decrypting the key bag 245 containing the content encryption key 224. Therefore, a way of securely storing the local storage key 222 is needed to be able to use the local storage key 222 for decrypting the key bag 245 at a later time. Otherwise, a restart of the local device 205, such as may be caused by a loss of power, would leave the local device 205 unable to reproduce the local storage key 222, and thus be unable to decrypt the key bag 245 and access the content encryption key 224. In one embodiment, the local storage key 222 is encrypted at 320 and stored, either in local storage 220, as illustrated in FIG. 2, or elsewhere.

In one embodiment, the local storage key 222 is encrypted using the cloud key 267 obtained from the server. In another embodiment, the local storage key is encrypted using another encryption key, the online key encryption key, which may be generated from the cloud key 267 and a device salt generated by the local device 205. The device salt may be stored in local storage 220 or elsewhere and is not provided to the server 250 or 275. The online key encryption key is then used to encrypt the local storage key 222. In one embodiment, the online key encryption key is not stored either on the local device 205 or by the server 250 or 275, but is regenerated from the cloud key and device salt as needed.

In one embodiment, credentials encrypted by the content encryption key 224 are also stored in local storage 220 and are further encrypted by the local storage key 222. In one embodiment, the credentials may be encrypted with the content encryption key 224 and stored in the key bag 245 that is then encrypted with the local storage key 222. In this embodiment, because the cloud key 267 is not stored by the local device 205 and the device salt is not stored by the server 250/275, neither the local device 205 nor the server 250/275 stores sufficient information to allow access to credentials encrypted with the content encryption key 224.

Thus, after completion of the first login on the local device 205, the key bag 245 has been stored on the local device in a way that allows secure access to credentials. Subsequent logins can now access the stored information after the user authenticates to the server 250 or 275 using the master password and email address or other user identifier, as described below.

Figure 4:
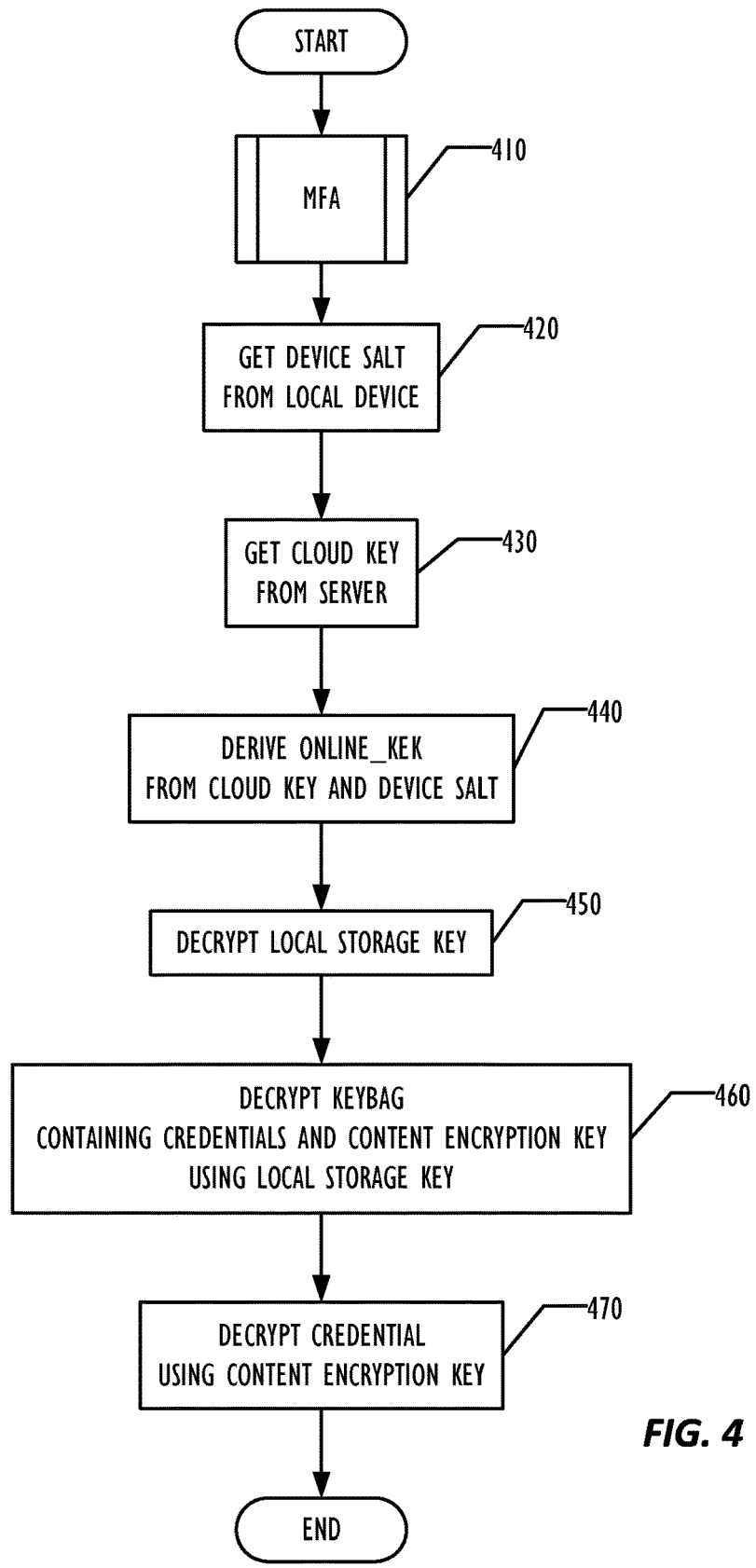
FIG. 4 is a flow chart illustrating a technique for credential decryption according to one or more embodiments.

FIG. 4 is a flow diagram illustrating a subsequent login to the credential manager application 240 according to one embodiment. In block 410, the user again uses multi-factor authentication to authenticate the user with the server 250/275, using the master password and an identifier such as an email address. Then in block 420, the device salt is obtained by the credential manager 240 from the local device 205.

The local device 205 also received the cloud key 267 from the server 250/275 in block 430. At 440, the credential manager application 240 may derive the online key encryption key from the cloud key 267 and device salt. At 450, the online key encryption key is used to decrypt the local storage key 222. In an embodiment in which the local storage key is encrypted with the cloud key 267, blocks 420 and 440 may be omitted, and the cloud key used to decrypt the local storage key 222 at 450.

The local storage key 222 is then used at 460 to decrypt the key bag 245, allowing access to the content encryption key 224, which may then be used to decrypt a credential needed to allow access to a resource protected by the credential. The master password is thus not used directly for decrypting the credential, but only to authenticate the user to the server 250/275, allowing access to the cloud key. Thus, in some embodiments, other factors than the master password, such as biometric authentication factors, may be used for the authentication using a trusted device 205, allowing the user to authenticate to the server 250/275 without supplying the master password. In a credential manager application 240 that keeps the user logged in for a period of time, additional credentials may be accessed without requiring a relogin, and thus the master password from the user. Once the user is logged out, the procedure of FIG. 4 may be repeated to relogin the user and gain access to the credentials.

The key wrapping technique described above thus allows secure access to credentials stored by the credential manager application 240 by protecting the key needed to access the credential in a way that only partial information is available to the local device 205 and the server 250/275. Although a variant on the above technique may generate an offline key encryption key from the master password, allowing a way to access the stored credentials without accessing the server 250/275, such a variant is less secure than the split key information technique described above. Also, because such variant may not provide equivalent level of security as would be enforced by the server authentication, this could be qualified as a downgrade attack and thus if more than one factor would be normally used, the local storage key should not be wrapped by such offline key encryption key. Other variants may use biometric data for encrypting the local storage key, given that it can provide an adequate level of entropy to protect the encrypted data.

From time to time, the master password may be changed, either because of policy, such as a policy that expires the master password after a predetermined time period, or because the user elects to change the master password. For this procedure, credential managers have typically required the user to provide the current master password as part of the login procedure. But what if the user has forgotten the master password? In conventional credential managers, there is no way to recover the lost master password, and all credentials are effectively lost, as well. This can be a major problem for the user, who may no longer remember all of the credentials stored by the credential manager, and thus cause the user to have to go through the forgotten password procedure of each website affected. Because one of the advantages of a credential manager is that it can store strong credentials that may not be memorable to the user, this negative experience triggered by the loss of the master password can be a serious problem for the user. But the techniques described above provide a way to allow the user to reset the master password securely, and thus regain access to the credentials stored in the credential manager, without the user knowing the master password.

Figure 5:
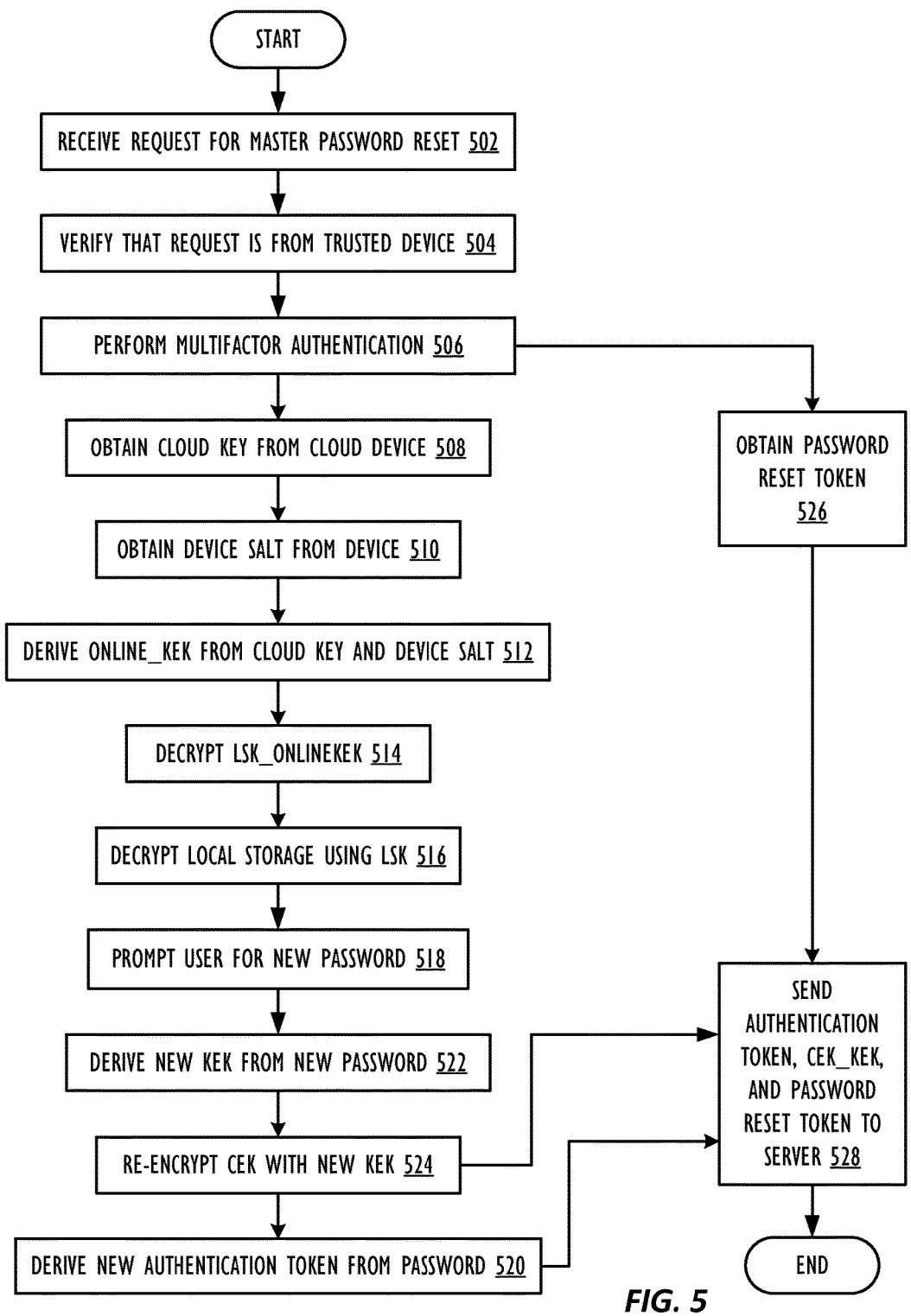
FIG. 5 is a flow diagram illustrating a technique for passwordless reset according to one or more embodiments.

FIG. 5 is a flow diagram illustrating a technique for passwordless reset according to one or more embodiments. Although the various tasks in the flow chart are illustrated in a particular order, in one or more embodiments, any of the various tasks may be performed in a different order, or simultaneously with other tasks. Further, in some embodiments, certain tasks may be omitted, other tasks may be added, and tasks illustrated separately may be combined.

In one or more embodiments, some of the technique may be performed by application 240 in local device 205. In addition, some of the tasks may be performed by server 250 or 275. The illustrated procedure assumes that the local storage key 222 has been used to encrypt the key bag containing the content encryption key 224 as described above, and that the user has enrolled at least one device as a trusted device. Although a technique for resetting the master password using the existing master password may employ at least some of the actions described below, that procedure is omitted from FIG. 5 for clarity.

The procedure begins at 502, when a request is received for a master password reset with an indication that the master password is unavailable. In one or more embodiments, the request may be received in the form of a user being unable to enter a master password. For example, a user may select an option in a user interface that says, "I have forgotten my password."

At 504, the server 250/275 verifies that the request is coming from a trusted device. In one or more embodiments, the server may receive a device ID from the device and may compare that against a data structure stored in the server that indicates trusted devices associated with a particular user account, such as the table described above in the discussion of FIG. 3.

The procedure continues at 506, where multifactor authentication is performed in order to authenticate the user. Unlike the multifactor authentication of FIG. 3, this multifactor authentication does not depend upon the user supplying the master password. For example, the credential manager application 240 may perform a biometric authentication, such as face or fingerprint authentication. In another embodiment, the credential manager 240 may send an email to an authorized email account with a special response that must be provided in order to authenticate the user. Any type of multifactor authentication technique may be used. In one embodiment, the application 240 may limit the number of attempts to reset a password using this procedure within a predetermined time period. FIG. 5 assumes that the multifactor authentication is successful. Actions to be taken if the multifactor authentication fails are omitted for clarity.

After multifactor authentication is performed, at 526 a password reset token is obtained from the server 250/275 and received by the local device 205. In one embodiment, a JSON Web Token (JWT) may be generated with a short life span, for example 1 minute. JWTs are a compact, URL-safe means of representing claims to be transferred between two parties, and are defined by the Internet Engineering Task Force document RFC 7519 (May 2015). Other types of tokens may be used as desired. The JWT token may be a cryptographic authentication claim for password reset.

Returning to 506, after multifactor authentication is performed, a cloud key 267, such as has been described above, is obtained from a cloud device, such as the server, and received by the local device 205 at 508. Blocks 508-516 are similar to the actions described above for gaining access to the content encryption key 224 in the description of FIG. 4. As illustrated in FIG. 5, the local storage key 222 is encrypted with an online key encryption key as described above in the discussion of FIG. 3. A similar technique to that described below may be employed where the local storage key is encrypted with the cloud key 267, as described above.

The flowchart continues at 510, where the device salt is obtained from the local device 205. At 512, the online key encryption key is derived using the cloud key 267 and the device salt. At 514, the encrypted local storage key 222 is decrypted using the online key encryption key.

The flowchart continues at 516, where the key bag 245 in the local storage 220 is decrypted using the local storage key 222, obtaining the content encryption key 224. Once the local storage is decrypted, at 518 a user may be prompted to enter a new master password. In one embodiment, the existing credentials may be decrypted using the content encryption key 224, a new content encryption key may be generated, and the credentials may be reencrypted using the new content encryption key. The new content encryption key 224 may then be stored into the key bag 240 and encrypted using the local storage key 222.

After the new password is received, at 520, a new authentication token is derived from the password. In addition, after the new password is received, at 522 a new key encryption key is derived from the new master password and the key encryption key salt. The flowchart continues at 524, where the content encryption key 224 is re-encrypted with the new key encryption key.

After the content encryption key 224 is re-encrypted with the new key encryption key, the new authentication token is derived from the new password, and the password reset token is received, the flowchart continues at 528, where the authentication token, the re-encrypted content encryption key 224, and the password reset token are transmitted to the server 250/275. If the password reset token has not yet expired and matches the one sent by the server 250/275, and the authentication token is received by the server 250/275, the server 250/275 may store the encrypted content encryption key. The master password reset procedure is then complete, and the user may then use the new master password for authentication to the server 250/275 as described above.

Thus, the loss of the master password, although requiring performance of the master password reset procedure of FIG. 5, avoids the loss of access to encrypted credentials caused in conventional credential managers upon loss of the master password. Indeed, because authentication at login from a trusted device may be performed using multifactor authentication that need not include the master password, in some embodiments the master password may be needed only at the first time the user logs in to the credential manager on a trusted device. Thereafter, the user may safely forget the master password, because the master password may securely be changed or reset without knowing the existing master password using the techniques described above.

Figure 6:
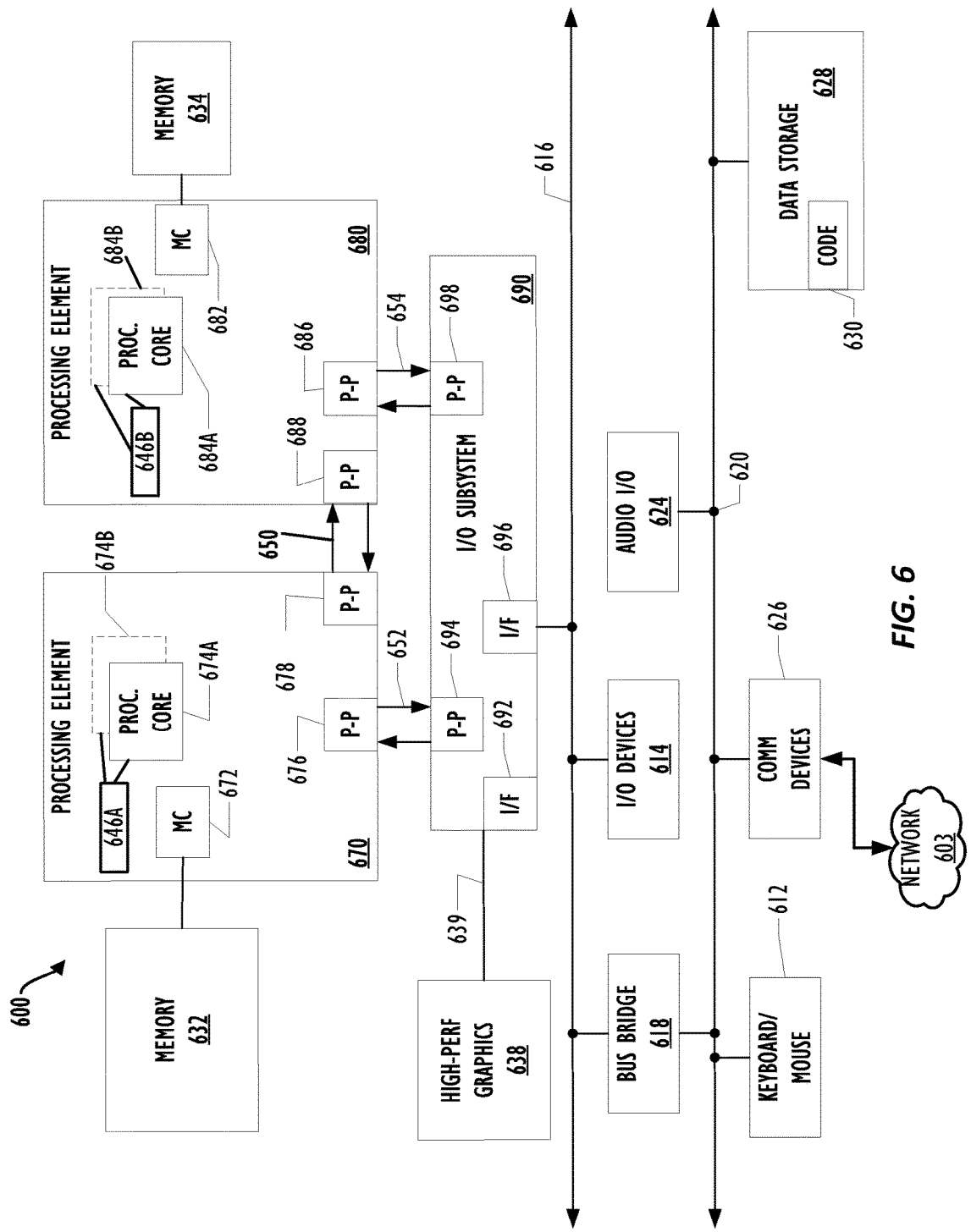
FIG. 6 is a diagram illustrating a computing device for use with techniques described herein according to one embodiment.

Referring now to FIG. 6, a block diagram illustrates a programmable device 600 that may be used within a computer device, such as local device 205, server 250, and server 275 in accordance with one or more embodiments. The programmable device 600 illustrated in FIG. 6 is a multi-processor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-5. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618, which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 6, a system may implement a multi-drop bus or another such communication topology. Although links 616 and 620 are illustrated as busses in FIG. 6, any desired type of link may be used. Also, the elements of FIG. 6 may alternatively be partitioned using more or fewer integrated chips than illustrated in FIG. 6.

Figure 7:
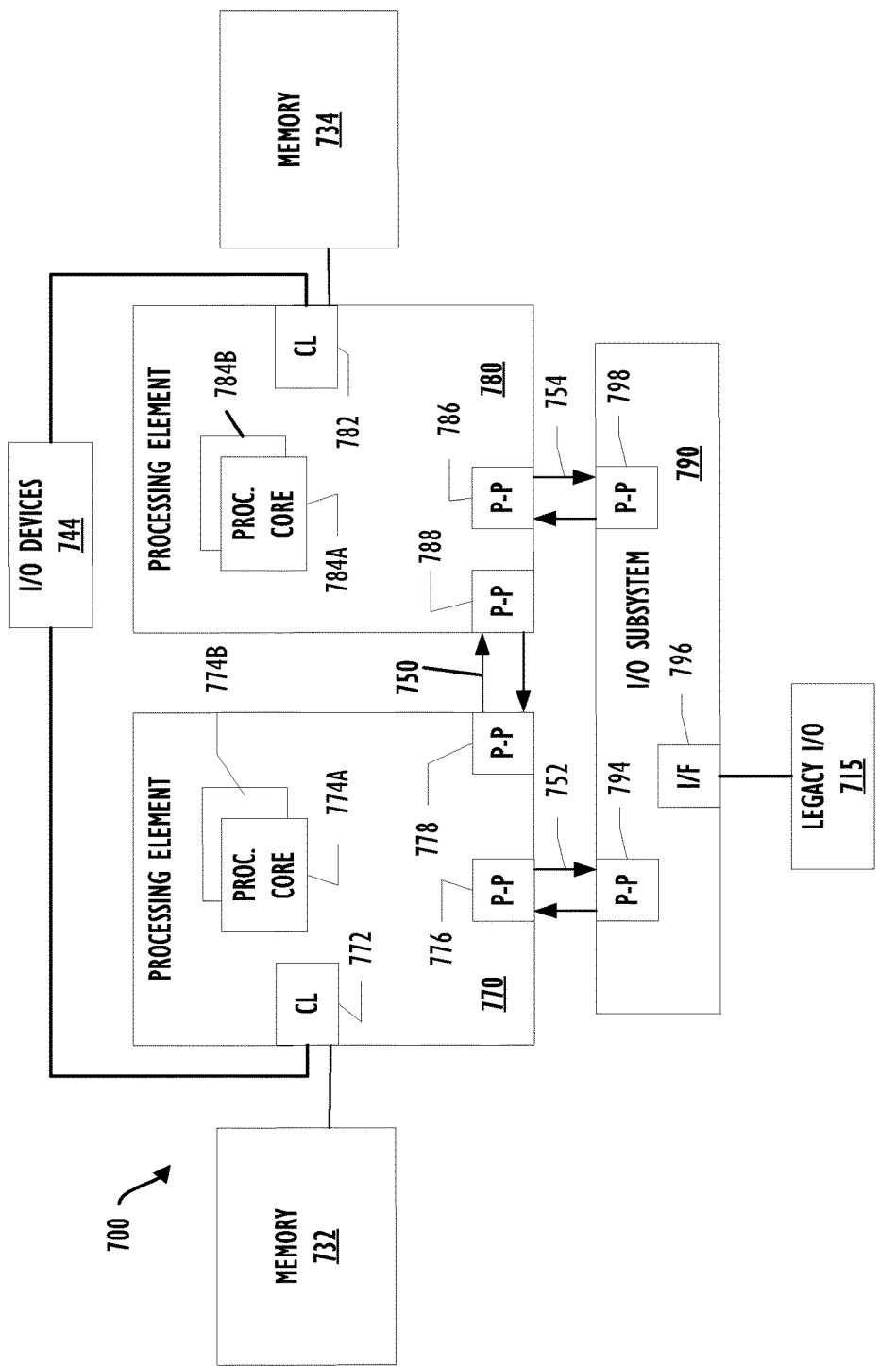
FIG. 7 is a block diagram illustrating a computing device for use with techniques described herein according to another embodiment.

Referring now to FIG. 7, a block diagram illustrates a programmable device 700 according to another embodiment. Certain aspects of FIG. 6 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A, and 784B. As illustrated in FIG. 7, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 6 and 7 are schematic illustrations of embodiments of programmable devices that may be utilized to implement various embodiments discussed herein. Various components of the programmable devices depicted in FIGS. 6 and 7 may be combined in a system-on-a-chip (SoC) architecture.

It is to be understood that the various components of the flowchart described above, could occur in a different order or even concurrently. It should also be understood that various embodiments of the inventions may include all or just some of the components described above. Thus, the flowcharts are provided for better understanding of the embodiments, but the specific ordering of the components of the flow chart are not intended to be limiting unless otherwise described so.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks, including multiple physical media that together contain the information stored thereon. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: receive a password reset request, wherein the password reset request is initiated at a first device, wherein the first device is a trusted device; obtain a cloud key from a network device, wherein the cloud key is associated with the first device; derive an online key encryption key using the cloud key; decrypt a local storage key using the online key encryption key; decrypt a local storage using the local storage key to obtain a content encryption key; and obtain a new password via user input; derive a new authentication token using the new password; and transmit new authentication token to the network device.

In Example 2 the subject matter of Example 1 optionally includes further comprising instructions that when executed cause the machine to, in response to obtaining a new password via user input: derive a new key encryption key from the new password; and re-encrypt the content encryption key with the new key encryption key.

In Example 3 the subject matter of Example 1 optionally includes wherein the content encryption key is stored in a secure storage of the first device.

In Example 4 the subject matter of Examples 1-3 optionally includes wherein the cloud key is obtained in response to authentication of a user associated with the password reset.

In Example 5 the subject matter of Example 4 optionally includes wherein authentication of a user associated comprises biometric authentication.

Example 6 is a system, comprising: one or more processors; and a memory, coupled to the one or more processors, on which instructions are stored comprising instructions which, when executed by the one or more processors cause the one or more processors to: receive a password reset request, wherein the password reset request is initiated at a first device, wherein the first device is a trusted device; obtain a cloud key from a network device, wherein the cloud key is associated with the first device; derive an online key encryption key using the cloud key; decrypt a local storage key using the online key encryption key; decrypt a local storage using the local storage key to obtain a content encryption key; and obtain a new password via user input; derive a new authentication token using the new password; and transmit new authentication token to the network device.

In Example 7 the subject matter of Example 6 optionally includes the instructions further comprising instructions that when executed cause the one or more processors to, in response to obtaining a new password via user input: derive a new key encryption key from the new password; and re-encrypt the content encryption key with the new key encryption key.

In Example 8 the subject matter of Example 6 optionally includes wherein the content encryption key is stored in a secure storage of the first device.

In Example 9 the subject matter of Examples 6-8 optionally includes wherein the cloud key is obtained in response to authentication of a user associated with the password reset.

In Example 10 the subject matter of Example 9 optionally includes wherein authentication of a user associated comprises biometric authentication.

Example 11 is a method, comprising: receiving a password reset request, wherein the password reset request is initiated at a first device, wherein the first device is a trusted device; obtaining a cloud key from a network device, wherein the cloud key is associated with the first device; deriving a online key encryption key using the cloud key; decrypting a local storage key using the online key encryption key; decrypting a local storage using the local storage key to obtain a content encryption key; and obtaining a new password via user input; deriving a new authentication token using the new password; and transmitting new authentication token to the network device.

In Example 12 the subject matter of Example 11 optionally includes further comprising, in response to obtaining a new password via user input: deriving a new key encryption key from the new password; and re-encrypting the content encryption key with the new key encryption key.

In Example 13 the subject matter of Example 11 optionally includes wherein the content encryption key is stored in a secure storage of the first device.

In Example 14 the subject matter of Examples 11-13 optionally includes wherein the cloud key is obtained in response to authentication of a user associated with the password reset.

In Example 15 the subject matter of Example 14 optionally includes wherein authentication of a user associated comprises biometric authentication.

Example 16 is a machine readable medium on which instructions are stored, comprising instructions that when executed cause a machine to: receive a master password from a user on a first device; obtain a cloud key from a network device, wherein the cloud key is associated with the first device; receive a key encryption key salt from the network device; generate a key encryption key using the key encryption key salt and the master password; receive an encrypted content encryption key from the network device; decrypt the encrypted content encryption key using the key encryption key; generate a local storage key using the cloud key; encrypt a local storage on the first device using the local storage key; and store the content encryption key in the encrypted local storage.

In Example 17 the subject matter of Example 16 optionally includes further comprising instructions that when executed cause the machine to receive the cloud key in response to authentication of the user.

In Example 18 the subject matter of Example 17 optionally includes wherein authentication of the user comprises biometric authentication.

In Example 19 the subject matter of Examples 16-18 optionally includes further comprising instructions that when executed cause the machine to: generate a device salt; and encrypt the local storage key using the device salt and the cloud key.

In Example 20 the subject matter of Example 19 optionally includes further comprising instructions that when executed cause the machine to: receive a request to access the encrypted local storage; obtain the cloud key from the network device; derive an online key encryption key from the cloud key; decrypt the encrypted local storage key with the online key encryption key; and access the encrypted local storage using the decrypted local storage key.

Example 21 is a computer system for resetting a password, comprising: means for receiving a password reset request, wherein the password reset request is initiated at a first device, wherein the first device is a trusted device; means for obtaining a cloud key from a network device, wherein the cloud key is associated with the first device; means for deriving an online key encryption key using the cloud key; means for decrypting a local storage key using the online key encryption key; means for decrypting a local storage using the local storage key to obtain a content encryption key; and means for obtaining a new password via user input; means for deriving a new authentication token using the new password; and means for transmitting new authentication token to the network device.

In Example 22 the subject matter of Example 21 optionally includes means for deriving a new key encryption key from the new password in response to obtaining a new password via user input; and means for re-encrypting the content encryption key with the new key encryption key.

In Example 23 the subject matter of Example 21 optionally includes further comprising means for securely storing the content encryption key on the first device.

In Example 24 the subject matter of Examples 21-23 optionally includes wherein the cloud key is obtained in response to authentication of a user associated with the password reset.

In Example 25 the subject matter of Example 24 optionally includes wherein authentication of a user associated comprises biometric authentication.

Example 26 is a computer system for managing credentials, comprising: means for receiving a master password from a user on a first device; means for obtaining a cloud key from a network device, wherein the cloud key is associated with the first device; means for receiving a key encryption key salt from the network device; means for generating a key encryption key using the key encryption key salt and the master password; means for receiving an encrypted content encryption key from the network device; means for decrypting the encrypted content encryption key using the key encryption key; means for generating a local storage key using the cloud key; means for encrypting a local storage on the first device using the local storage key; and means for storing the content encryption key in the encrypted local storage.

In Example 27 the subject matter of Example 26 optionally includes further comprising means for receiving the cloud key in response to authentication of the user.

In Example 28 the subject matter of Example 27 optionally includes wherein authentication of the user comprises biometric authentication.

In Example 29 the subject matter of Examples 26-28 optionally includes further comprising: means for generating a device salt; and means for encrypting the local storage key using the device salt and the cloud key.

In Example 30 the subject matter of Example 29 optionally includes further comprising: means for receiving a request to access the encrypted local storage; means for obtaining the cloud key from the network device; means for deriving an online key encryption key from the cloud key; means for decrypting the encrypted local storage key with the online key encryption key; and means for accessing the encrypted local storage using the decrypted local storage key.

It is to be understood that the above description is intended to be illustrative, and not restrictive. For example, the above-described embodiments may be used in combination with each other. As another example, the above-described flow diagrams include a series of actions that may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. At least one of a storage device or storage disk, comprising instructions that when executed cause a trusted device to at least:
    initiate a first transmission of a password reset request, the password reset request to request replacement of a first password with a new password without providing the first password;
    derive an online key encryption key based on a cloud key obtained from a network device;
    decrypt a local storage key using the online key encryption key;
    decrypt a key bag using the local storage key to obtain at least a content encryption key, the key bag being an encrypted data structure local to the trusted device;
    in response to decrypting the key bag, decrypt information encrypted by the content encryption key, using the content encryption key;
    obtain the new password;
    derive a new online key encryption key from the new password;
    re-encrypt the content encryption key with the new online key encryption key, the re-encrypted content encryption key to enable authentication of a user at the network device using the new password;
    derive a new authentication token using the new password; and
    initiate a second transmission of the new authentication token and the re-encrypted content encryption key to the network device.

2. The storage device or storage disk of claim 1, wherein the key bag of the trusted device includes the content encryption key and the information encrypted by the content encryption key, the information encrypted by the content encryption key including credentials used to login to a website.

3. The storage device or storage disk of claim 1, wherein the instructions cause the trusted device to obtain the cloud key in response to authentication of the user associated with the password reset request.

4. The storage device or storage disk of claim 3, wherein the authentication of the user associated with the password reset request includes biometric authentication.

5. A trusted device, comprising:
    a memory including instructions and a key bag; and
    one or more processors to execute the instructions to:
        initiate a first transmission of a password reset request, the password reset request to request replacement of a first password with a new password without provision of the first password;
        derive an online key encryption key based on a cloud key obtained from a network device;
        decrypt a local storage key using the online key encryption key;
        decrypt the key bag using the local storage key to obtain at least a content encryption key;
        in response to decrypting the key bag, decrypt information encrypted by the content encryption key, using the content encryption key;
        obtain the new password;
        derive a new online key encryption key from the new password;
        re-encrypt the content encryption key with the new online key encryption key;
        derive a new authentication token using the new password; and
        initiate a second transmission of the new authentication token and the re-encrypted content encryption key to the network device, to enable authentication of a user at the network device using the new password.

6. The trusted device of claim 5, wherein the key bag includes the content encryption key and the information encrypted by the content encryption key, the information encrypted by the content encryption key including credentials used to login to a website.

7. The trusted device of claim 5, wherein the one or more processors are to obtain the cloud key in response to authentication of the user.

8. The trusted device of claim 7, wherein the one or more processors are to authenticate the user via biometric authentication.

9. A method, comprising:
    initiating, at a trusted device, a first transmission of a password reset request, the password reset request to request replacement of a first password with a new password without provision of the first password;
    deriving an online key encryption key based on a cloud key obtained from a network device;
    decrypting a local storage key using the online key encryption key;
    decrypting a key bag local to the trusted device using the local storage key to obtain a content encryption key;
    in response to decrypting the key bag, decrypting information encrypted by the content encryption key, using the content encryption key;
    obtaining the new password;
    deriving a new online key encryption key from the new password;
    re-encrypting the content encryption key with the new online key encryption key;
    deriving a new authentication token using the new password; and
    initiating a second transmission of the new authentication token and the re-encrypted content encryption key to the network device, to enable authentication of a user at the network device using the new password.

10. The method of claim 9, the key bag of the trusted device includes the content encryption key and the information encrypted by the content encryption key, the information encrypted by the content encryption key including credentials used to login to a website.

11. The method of claim 9, further including obtaining the cloud key in response to authentication of the user associated with the password reset request.

12. The method of claim 9, further including authenticating the user via biometric authentication.

13. At least one of a storage device or a storage disk comprising instructions that, when executed, cause a trusted machine to at least:
- generate a key encryption key based on a key encryption key salt from a network device and a master password from a user of the trusted machine;
- decrypt an encrypted content encryption key using the key encryption key, the encrypted content encryption key from the network device;
- generate a local storage key based on a cloud key obtained from the network device, the cloud key associated with the trusted machine;
- encrypt information with the decrypted content encryption key;
- encrypt a key bag of secure storage on the trusted machine using the local storage key;
- store the decrypted content encryption key in the key bag; and
- encrypt the local storage key using an online encryption key obtained from the network device.

14. The at least one storage device or storage disk of claim 13, wherein the instructions cause the trusted machine to obtain the cloud key in response to authentication of the user.

15. The at least one storage device or storage disk of claim 14, wherein the authentication of the user includes biometric authentication.

16. The at least one storage device or storage disk of claim 13, wherein the instructions cause the trusted machine to:
- generate a device salt; and
- encrypt the local storage key using the device salt and the cloud key.

17. The at least one storage device or storage disk of claim 16, wherein the instructions cause the trusted machine to:
- access the key bag based on a request;
- derive an online key encryption key from the cloud key;
- decrypt the encrypted local storage key with the online key encryption key; and
- access the key bag using the decrypted local storage key.

* * * * *